United States Patent [19]
Mueller

[11] Patent Number: 5,367,753
[45] Date of Patent: Nov. 29, 1994

[54] TENTERING CLAMP AND TENTERING CHAIN COMPRISING SUCH CLAMPS

[75] Inventor: Adolf Mueller, Weissensberg, Germany

[73] Assignee: Lindauer Dornier GmbH, Lindau, Germany

[21] Appl. No.: 140,244

[22] Filed: Oct. 21, 1993

[30] Foreign Application Priority Data

Oct. 24, 1992 [DE] Germany .............................. 4235994

[51] Int. Cl.$^5$ ................................................ D06C 3/04
[52] U.S. Cl. ........................................... 26/73; 26/93
[58] Field of Search ............... 26/73, 72, 93, 88, 89, 26/71, 94; 264/290.2

[56] References Cited

U.S. PATENT DOCUMENTS

| | | | |
|---|---|---|---|
| 3,195,177 | 7/1965 | Kawamura et al. | 18/1 |
| 4,614,011 | 9/1986 | Nicholas et al. | 26/73 |
| 4,637,103 | 1/1987 | Hutzenlamb | 26/73 |
| 4,890,365 | 1/1990 | Langer | 26/91 |
| 5,081,750 | 1/1992 | Mölz | 26/93 |
| 5,161,674 | 11/1992 | Rutz et al. | 26/73 |

FOREIGN PATENT DOCUMENTS

| | | | |
|---|---|---|---|
| 0291775 | 11/1988 | European Pat. Off. | |
| 2078809 | 1/1982 | United Kingdom | 26/73 |

Primary Examiner—Clifford D. Crowder
Assistant Examiner—Amy B. Vanatta
Attorney, Agent, or Firm—W. G. Fasse; W. F. Fasse

[57] ABSTRACT

Tentering clamps for an endless tentering chain are formed so that two clamp bodies slideably mounted on at least one common guide bar can move toward each other and away from each other for adjusting the pitch. The guide bar or bars have entraining stop elements so positioned that an axial pulling force that moves the tentering chain, is transmitted through the guide bar or bars. The pitch is adjusted with the help of at least one, preferably two, toggle link mechanisms carrying a control roller engaging a guide rail. When the toggle links of the toggle link mechanism are straightened out in the travel direction of the tentering chain, the toggle link mechanism is substantially relieved of the axial tension force or load because the load passes through the guide bars (10) and the clamp bodies forming a pair. A plurality of such compound tentering clamp body pairs are linked by chain link plates and respective linking chain journal pins (23).

19 Claims, 3 Drawing Sheets

TENTERING CLAMP AND TENTERING CHAIN COMPRISING SUCH CLAMPS

FIELD OF THE INVENTION

The invention relates to a tentering clamp suitable for adjusting the pitch between two neighboring clamp bodies. The pitch will be defined below. The invention also relates to a tentering chain comprising such compound tentering clamps. Clamps and chains of this type are used in film web stretching and shrinking machines.

BACKGROUND INFORMATION

Conventional tentering clamps are equipped with guide rollers for a vertical and horizontal guiding along guide rails in a shrinking machine. Each clamp has a clamp body having connected thereto a clamping section for gripping and holding the edge of a film web. Conventional tentering chains with these clamps also include features for changing the on-center spacing or pitch between neighboring tentering clamp bodies. Articulated connecting devices link a plurality of such tentering clamps to each other to form a tentering chain.

Devices as just described are used for stretching a film web and/or for shrinking a film web in a controlled manner. Several different machines of this type have become known in the art. A basic requirement that must be met by all tentering chains for a controlled stretching and/or shrinking of a film web of thermoplastic material is the fact that the pitch between neighboring tentering clamps must be variable so as to increase during certain time intervals of a full revolution of an endless tentering chain and so as to decrease during other time intervals in the same revolution.

European Patent Publication 0,291,775 (Langer), published on Nov. 23, 1988, discloses an apparatus for the simultaneous biaxial treatment of film webs. European Patent Publication 0,291,775 corresponds to U.S. Pat. No. 4,890,365 (Langer), issued on Jan. 2, 1990. The edges of the film web are clamped in the Langer apparatus by tentering clamps that are mounted to chain links forming chains running around an endless track. The connection between two successive tentering clamps is established by two chain links journalled to each other. These chain links can be brought in pairs into a lengthwise extending arrangement or into a kinked arrangement and vice versa. This positional change of the chain links is controlled by control rails arranged outside the chain guide track, whereby one of the chain links is constructed as a bell crank carrying at a free end of one of its arms a roller engaging the control rail. Thus, the spacing between two successive tentering clamps can be shortened or lengthened, thereby controlling the film stretching and the film shrinking with a fine ratio. The control features in this known Langer apparatus are quite substantial and the linking mechanism is so constructed that the adjustment forces are transmitted horizontally from the control rail through the linking mechanism, whereby the latter must be dimensioned to be capable of not only taking up the adjustment forces, but also the pulling forces that drive the tentering chain.

U.S. Pat. No. 3,195,177 (Kawamura), issued on Jul. 20, 1965, discloses an apparatus for stretching thermoplastic film. The clamping elements for holding the edge or margin of a film web are connected to a linking mechanism capable of adjusting the pitch between neighboring clamping elements. The linking mechanism according to Kawamura is constructed as a toggle lever mechanism that can be effective in a vertical plane or in a horizontal plane. For example, when the adjustment forces are transmitted vertically to the clamping elements, at least one lower and one upper guide is required. The journal points or pivot points of the links forming the linking mechanism are journalled to and guided in the upper and lower guides. The clamping elements also referred to as tentering clamps according to Kawamura are of rather simple construction. However, such simple tentering clamps are not sufficient for meeting the requirements of modern film stretching machines operating at substantial treatment speeds. For example, the following requirements are not satisfactorily met by the Kawamura tentering clamps; a secure clamping of the film edges through the entire treatment operation; a positive, yet easily moving guiding of the tentering clamps; and a small effort and expense for the structural elements that are required for controlling the pitch variations in the Kawamura apparatus. Kawamura also does not show a compact adjustment mechanism for varying the pitch so that a fine tuned variation of the pitch T, particularly a reduction of the pitch T between neighboring tentering clamps is not achievable. Further, Kawamura does not show any features in which the toggle lever of the adjustment mechanism is free of the pulling forces that move the tentering chain at least in those phases of the operation where adjustment forces for a pitch variation do not need to be applied to the pitch adjustment mechanism.

OBJECTS OF THE INVENTION

In view of the foregoing it is the aim of the invention to achieve the following objects singly or in combination:

to construct a tentering clamp for use in an endless tentering chain in such a way that the pitch between neighboring tentering clamp bodies can be adjusted in a finetuning manner with the aid of a pivoted or journalled linking mechanism;

to make sure that the pulling force that drives the endless tentering chain is not effective on the pivoted or journal linking mechanism when the latter is not required to transmit pitch adjustment forces, more specifically, when the pivoted or journalled linking mechanism is in a stretchedout position;

to interconnect a plurality of compound tentering clamps to form a tentering chain; and to pivotally interconnect the clamp bodies of a compound tentering clamp by at least one toggle lever which is kinked when the pitch is reduced and which is stretched out when the maximum pitch is intended.

SUMMARY OF THE INVENTION

The above objects have been achieved according to the invention in a tentering clamp that has two clamp bodies forming a pair. Both clamp bodies are movably interconnected by at least one guide bar, preferably two guide bars extending in parallel to each other. The guide bar or two guide bars preferably extend with their longitudinal parallel axes in a plane that coincides with a clamping plane in which the film web is held by the tentering clamps. The guide bar or bars function as a tension transmitting device for the forces that transport the tentering chain through the film web treatment apparatus. Both clamp bodies of a pair are axially displaceable relative to each other along the respective guide bar or bars. This displacement of the clamp bodies relative to each other is controlled by at least one, preferably two toggle levers, whereby two toggle levers form a double toggle lever mechanism. Each toggle lever comprises two toggle links and a toggle pin that journals one end of each toggle link to a respective end of the other toggle link. The opposite end of each toggle link is pivoted to the respective clamp body. The toggle journal pin is formed as a toggle bolt to which the first mentioned toggle link ends are journalled or pivoted. The toggle bolt extends between the two clamp bodies. When two toggle levers are used, both toggle bolts extend in parallel to each other between the two clamp bodies. A free end of the toggle bolt or toggle bolts carries a control roller rotatably mounted to the free toggle bolt end which is positioned opposite the clamping section of the respective clamp body. The control roller or rollers contact a control rail, the position and configuration of which determines the operation of the respective toggle lever between a fully stretched out condition of the toggle links and a fully kinked position of the toggle links. The pitch T between the two clamp bodies is largest when the toggle links are stretched out. The pitch is smallest when the toggle links are fully kinked. The pitch in turn determines the size of the shrinkage applied to the film web, thus providing a fine tuned shrinkage control.

A plurality of the just described tentering clamps are interconnected by chain plates to form a tentering chain. One end of each chain plate is pivoted or journalled to the respective clamp body of a pair of clamp bodies. The other end of each chain plate is journalled to a linking chain pin. The journalling or pivoting connection of the chain plates to the clamp body is preferably accomplished by a vertical bolt extending substantially centrally through the respective clamp body. Free ends of the bolt protrude outside of the clamp body and the chain plates are pivoted to the free bolt ends. Instead of the bolts, studs may be used that project coaxially from opposite sides of the respective clamp body. The bolt or studs carry freely rotating guide rollers for stabilizing the respective clamp bodies forming a pair in a lateral direction. Similarly, the linking chain pin that is positioned between two neighboring compound tentering clamps, also carries on its free end rotatably mounted guide rollers for guiding the tentering chain along guide tracks forming part of the treatment machine.

The invention achieves the advantage that the tentering clamp has a compact structure which in turn results in a short adjustment displacement of the linking mechanism. As a result, the adjustment between the clamp bodies of a pair forming a tentering clamp, can be performed with a fine tuning. Another advantage is seen in the fact that the guide bar or bars for the clamp bodies of a tentering clamp function as a tension force transmitting device so that the toggle levers and especially the journalling joints of the toggle levers, are free of tension loads. Similarly, the adjustment mechanisms for fine tuning the pitch are relieved of tension loads which positively increases the useful life of the present tentering clamps and tentering chains comprising such clamps.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
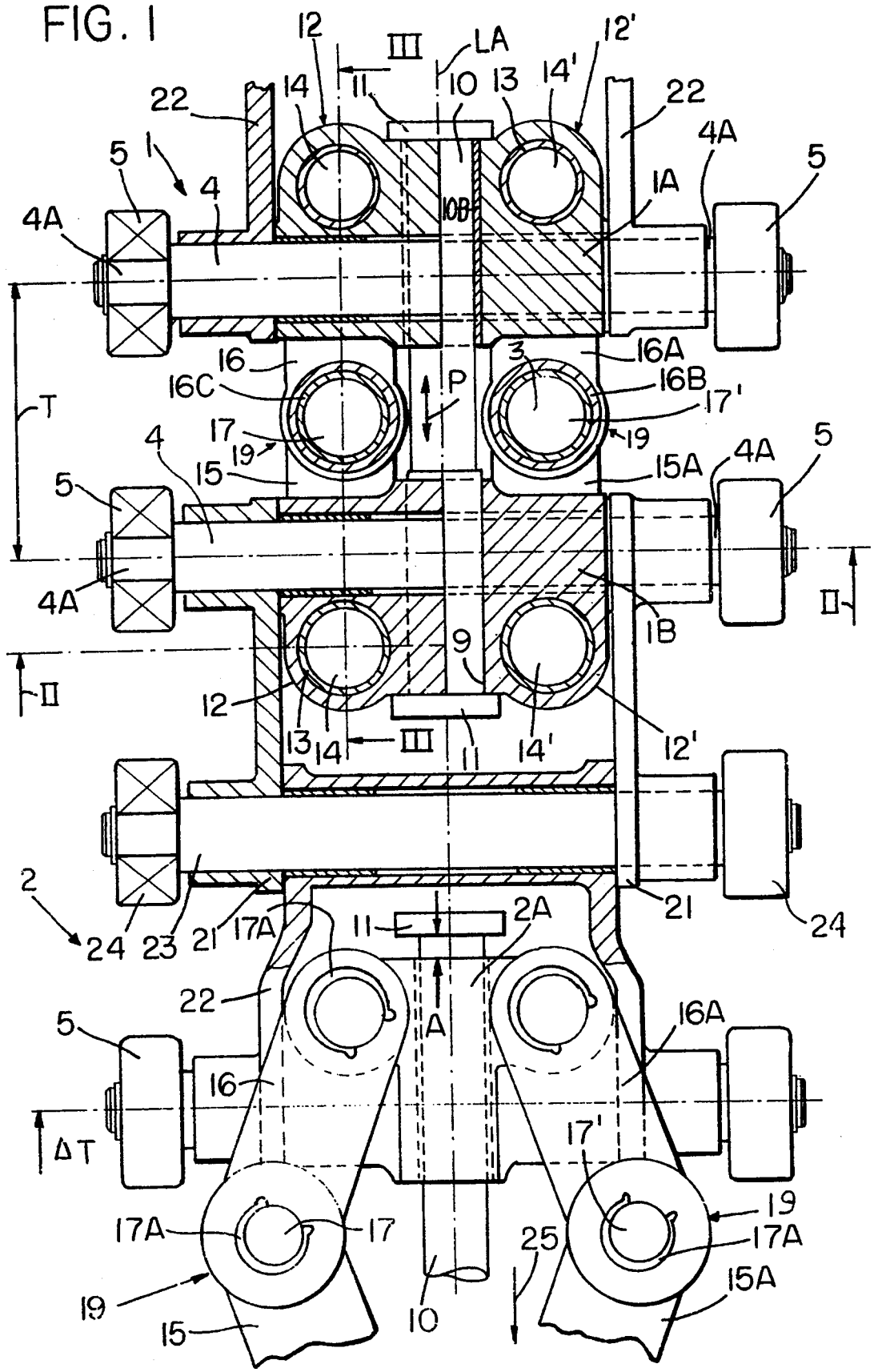
FIG. 1 is a view partially in section of two tentering clamps, whereby one clamp is shown fully in section, and a portion of the other tentering clamp is shown in a side view, and both tentering clamps are linked by chain plates and a linking chain pin forming a journal pin.
Figure 2:
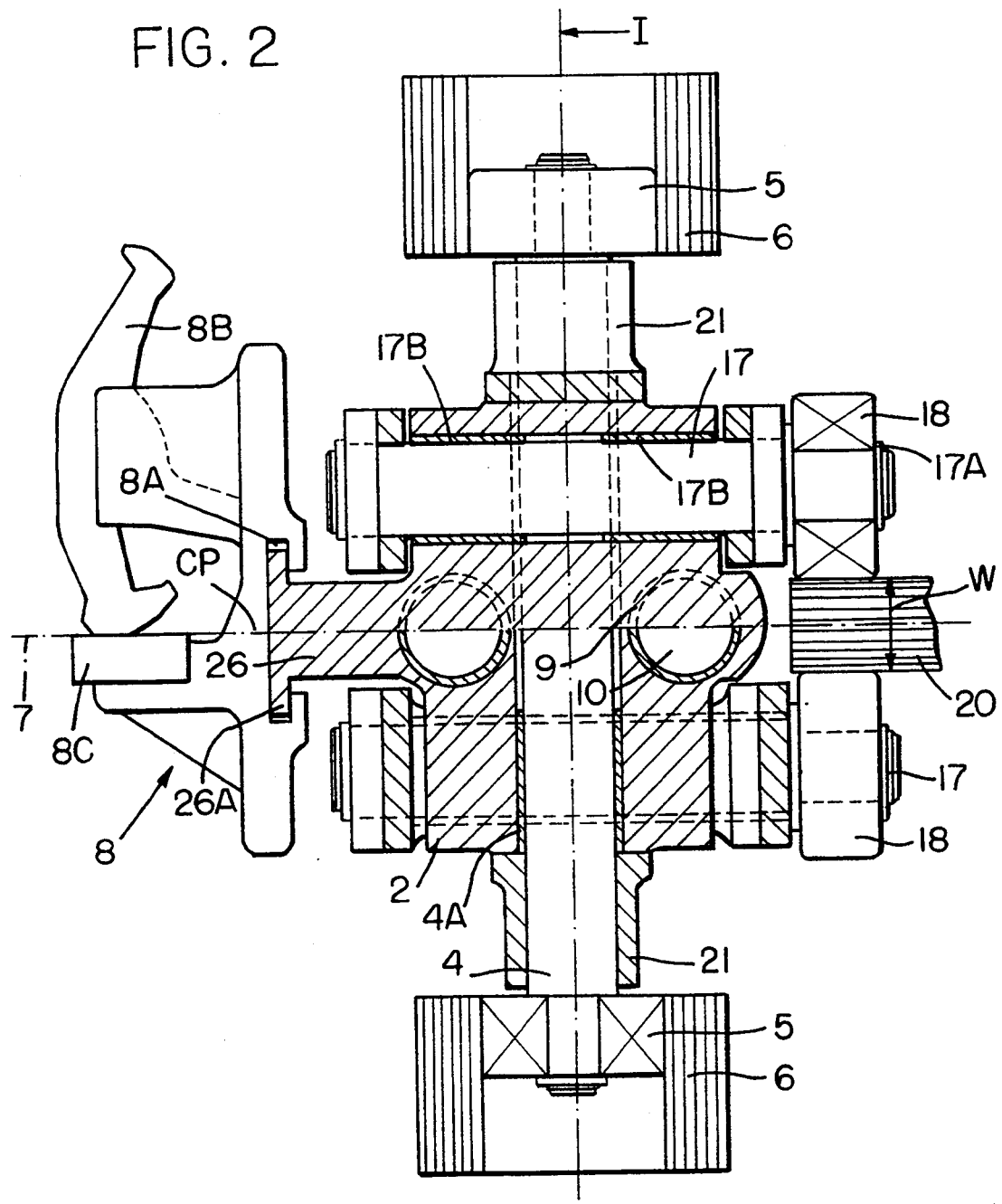
FIG. 2 is a sectional view along section line II—II in FIG. 1, showing the position of the clamping section of the present tentering clamp.

FIG. 1 shows in its right-hand part a sectional view through a tentering clamp 1 according to the invention, while the left-hand part of FIG. 1 shows a side view of a portion of a further tentering clamp 2 of the same construction as the clamp 1. Thus, only one clamp will be fully described. The tentering clamp 1 comprises two clamp bodies 1A and 1B forming a pair. The clamp bodies 1A and 1B preferably have a mirror-symmetrical configuration relative to a central plane 3 extending perpendicularly to the plane of the drawing sheet. A bolt 4 passes approximately centrally through each clamp body 1A and 1B. Each bolt has a length so that both bolt ends project outside of the respective clamp body. More specifically, the bolt length is sufficient to journal chain plates 21 and 22 on these bolts and to also rotatably mount a freely rotatable guide roller 5 to each bolt end. These guide rollers 5 engage guide rails 6 as shown in FIG. 2 to provide lateral stability to the respective tentering clamp 1, 2, and so forth in a tentering chain.

Instead of the bolts 4, it is possible to provide integral mounting studs on opposite sides of the clamp bodies 1A and 1B. These studs would protrude just as the bolts 4 and carry the chain plates 21, 22 as well as the guide rollers 5. The studs would be axially aligned along the central axes shown in FIG. 1 for the bolts 4. Since these studs would be attached to or form an integral part of the respective clamp body 1A, 1B, the drilling of the holes for the bolts 4 would not be necessary.

While the guide rollers 5 provide the required horizontal guiding of the compound tentering clamps, at least one further guide roller, not shown, is provided for each clamp body 1A, 1B for a vertical guiding of the clamp and for supporting its weight.

According to the invention, each tentering clamp body 1A, 1B, 2A, and so forth, is provided with at least one, preferably with two guide bars 10 which have a longitudinal axis extending perferably in parallel to each other and preferably in the same plane as a clamping plane CP of a clamping section 8. The guide bar or guide bars 10 pass through axially aligned respective bores 9 in the clamp bodies 1A, 1B as seen in FIGS. 1 and 2. The clamp bodies 1A, 1B are slideably received on the guide bar or bars 10. Each guide bar 10 has a stop element 11 at its outer end. One of the stop elements 11 may be an integral component of one end of guide bar 10, while the other stop element is removably secured, for example, by a threading to the opposite end of the guide bar to permit assembly of the two clamp bodies 1A, 1B on the guide bar or bars. The guide bar 10 may also be divided into two sections, each having as an integral part thereof the stop element 11, whereby the two guide bar sections are releasably interconnected, for example, by a male and female threading not shown. Within the limits of the stop elements il the clamp bodies 1A and 1B are slideable horizontally back and forth on the guidebars 10 as indicated by the arrow P.

Figure 3:
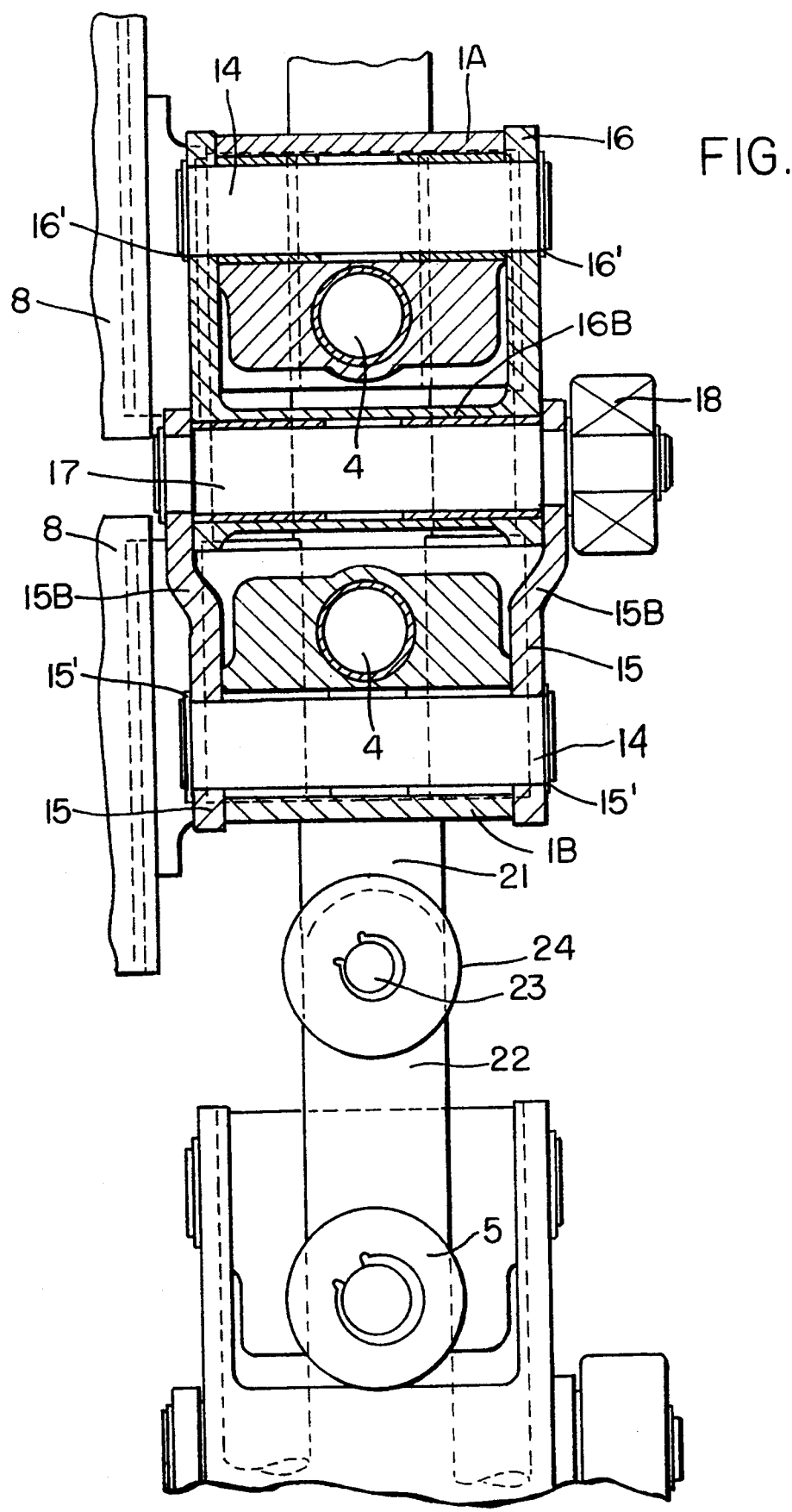
FIG. 3 is a view partially in section, along section line III—III in FIG. 1 and also showing the linking of two tentering clamps according to the invention by a linking chain pin and respective chain plates.

Each clamp body 1A, 1B is provided with upper lobes 12 and lower lobes 12'. Each lobe is provided with a cross-bore 13 extending crosswise to the longitudinal central axis LA of the tentering clamp. A pulling force is applied along LA for transporting the tentering chain through a film web treatment apparatus not shown. The bores 13 also extend crosswise to the bores 9 in which the guide bar 10 is received. Upper journal pins 14 extend through the upper bores 13. Lower journal pins 14' extend through the lower bores 13. All bores may hold friction reducing sleeves. As best seen in FIG. 3, toggle links 15, 16 are secured with their one end to free ends of these journal pins 14, for example, by conventional spring rings 15', 16'. The journal pins 14 are rotatable in the respective bores and preferably also supported by friction reducing sleeves. The toggle links 15 are cranked at 15B for alignment with the toggle links 16 which form an integral unit with a journal bushing 16B provided with a bore 16C through which a toggle journal bolt 17 extends to form a toggle joint 19.

Referring again to FIG. 1, the toggle links 15 and 16 journalled with their outer ends to the journal pins 14 and with their inner ends to the toggle journal bolt 17 form a linking toggle lever mechanisms 19, while the toggle links 15A and 16A journalled to the journal pins 14' with their outer ends and to the toggle journal bolt 17' with their inner ends, form a second linking toggle lever mechanism 19. As shown in FIG. 1, the two clamp bodies 1A and 1B are linked to each other by the two just described toggle lever mechanisms 19. When these mechanisms 19 are stretched out as shown in FIG. 1, the pitch T is at its maximum. The pitch T is defined as the on-center spacing between the central axes of the two bolts 4.

As shown in FIGS. 2 and 3, each toggle journal bolt 17 carries at its free end opposite the clamping section 8 a control roller 18. As best seen in FIG. 2, the two control rollers 18 engage a control rail 20 secured to the frame of the treatment machine. The width W of the control rail 20 varies along its length so that the corresponding spacing between the two control rollers 18 that engage the control rail 20 also varies accordingly, thereby moving the two toggle lever mechanisms 19 between the stretched out position shown in the right-hand part of FIG. 1 resulting in the maximum pitch T, and the kinked position shown in the left-hand portion of FIG. 1 resulting in the minimum pitch.

Rather than using two toggle lever mechanisms 19, as shown in FIG. 1, it may be sufficient to use but one such toggle lever mechanism for light and medium duty operations. In any event, the pitch adjustment is the same and the range of adjustment ΔT is shown at the upper left-hand corner of FIG. 1, which also indicates the spacing A between the axially facing wall of the clamp body 2A and the inwardly facing ring surface of the respective stop element 11. This spacing A depends on the degree of kinking of the two toggle links 15 and 16 that are journalled at 17. Incidentally, spring rings 17A hold the journal shafts 17 in place against axial displacment.

Referring further to FIG. 1, each tentering clamp 1, 2, and so forth is equipped with outer chain link plates 21 and inner chain link plates 22. One end of each chain link plate 21, 22 is journalled to the shafts 4 of neighboring clamps 1, 2 while the other ends are journalled to a linking chain pin 23 carrying a guide roller 24 at each of its ends. The guide rollers 24 are rotatably mounted to the free ends of the linking chain pin 23. Incidentally, the pulling direction is indicated by an arrow 25 in FIG. 1.

FIG. 2 shows how the clamping section 8 is mounted to the individual clamp bodies, namely with the aid of a mounting 26 having a flange 26A which is received in a groove 8A of the clamping section 8 which is also equipped with a clamping finger 8B for holding a film web 7 on a clamping table 8C that defines clamping plane CP in which the central longitudinal axes of the guide bars 10 are preferably located.

FIG. 3 shows that each tentering body 1A, 1B carries its own tentering clamp 8. Further, the chain link plates 21, 22 are shown in a side view illustrating that their vertical dimension in the view of FIG. 3 may be substantially smaller than the width of the clamp bodies 1A, 1B.

Otherwise FIG. 3 is self-explanatory.

Although the invention has been described with reference to specific example embodiments, it will be appreciated that it is intended to cover all modifications and equivalents within the scope of the appended claims.

What I claim is:

1. A tentering clamp, comprising two clamp bodies forming a pair of clamp bodies, a clamping section secured to each of said clamp bodies for clamping a material edge in a clamping plane, at least one guide bar for each pair of clamp bodies, said at least one guide bar passing through both of said clamp bodies forming said pair of clamp bodies so that both clamp bodies of said pair are slideably mounted on said guide bar for moving toward each other so that a pitch between said clamp bodies of said pair is reduced and for moving away from each other so that said pitch is increased, said at least one guide bar comprising limit stop elements for limiting a movement of said clamp bodies forming a pair away from each other to a maximum pitch, pitch control lever links and journals journalling said lever links to said clamp bodies of a pair for controlling said moving of said clamp bodies toward and away from each other, and at least one pitch control roller rotatably mounted for engaging a control rail for adjusting said pitch by controlling said movement of said clamp bodies.

2. The tentering clamp of claim 1, wherein said pitch control lever links comprise at least one toggle link mechanism including two toggle lever links journalled to said clamp bodies, said journals including a toggle pin journalling said two toggle lever links to each other to form said toggle link mechanism, said toggle pin having a free end, to which said control roller is rotatably mounted.

3. The tentering clamp of claim 1, comprising two guide bars for each pair of clamp bodies, said two guide bars being arranged in parallel to each other, each guide bar comprising two of said limit stop elements.

4. The tentering clamp of claim 3, wherein each of said two guide bars has a central longitudinal axis, both axes extending in said clamping plane.

5. The tentering clamp of claim 2, comprising two toggle link mechanisms arranged in parallel to each other between said two clamp bodies forming a pair.

6. The tentering clamp of claim 1, wherein said pitch control lever links comprise at least two link levers, said journals including a first journal connection journalling one end of each of said link levers to the respective clamp body, a second journal connection linking said two link levers to each other at the other end of each of said link levers between said two clamp bodies, said two link levers and journal connections forming a toggle mechanism that tends to push said clamp bodies apart when said link levers extend substantially in a travel direction of said compound tentering clamp, and wherein said toggle mechanism brings said two clamp bodies closer together when said link levers extend at an angle relative to said travel direction.

7. The tentering clamp of claim 6, wherein said second journal connection comprises a journal pin having a free pin end protruding from said clamp bodies, said control roller being rotatably mounted to said free pin end.

8. The tentering clamp of claim 6, wherein said first journal connection is located above said clamping plane.

9. The tentering clamp of claim 6, wherein said first journal connection is located below is said clamping plane.

10. The tentering clamp of claim 1, wherein said stop elements of said at least one guide bar bear against the respective clamp body when said pitch control lever links extend horizontally substantially free of any pitch adjusting load, whereby said at least one guide bar transmits a tension load to said clamp bodies at a maximum pitch defined as a maximum spacing between said two clamp bodies as permitted by said stop elements.

11. The tentering clamp of claim 1, wherein at least one of said stop elements is separately attachable to said at least one guide bar.

12. The tentering clamp of claim 1, wherein one of said stop elements is secured to each end of said at least one guide bar.

13. The tentering clamp of claim 7, wherein said control roller faces away from said clamping section.

14. The tentering clamp of claim 1, further comprising at least one guide shaft secured to each of said clamp bodies and at least one guide roller secured to each of said guide shafts, said guide rollers being adapted for engaging a guide track for stabilizing said tentering clamp.

15. The tentering clamp of claim 2, wherein at least one of said toggle links has two arms linked by a bushing through which said toggle pin extends.

16. An endless tentering chain, comprising a plurality of tentering clamps and articulating links linking said tentering clamps to each other to form said endless tentering chain, each of said tentering clamps comprising two clamp bodies forming a pair of clamp bodies, a clamping section secured to each of said clamp bodies for clamping a material edge in a clamping plane, at least one guide bar for each pair of clamp bodies, said at least one guide bar passing through both of said clamp bodies slideably mounted on said at least one guide bar for moving toward each other so that a pitch between said clamp bodies of said pair is reduced and for moving away from each other so that said pitch is increased, said at least one guide bar comprising limit stop elements limiting a movement of said clamp bodies forming a pair away from each other to a maximum pitch, pitch control lever links and journals journalling said lever links to said clamp bodies of a pair for controlling said moving of said clamp bodies toward and away from each other, and at least one pitch control roller rotatably mounted for engaging a control rail for adjusting said pitch by controlling said moving of said clamp body.

17. The endless tentering chain of claim 16, wherein said articulating links comprise chain link plates journalled to said clamp bodies and a linking chain pin journalling said chain link plates to each other.

18. The endless tentering chain of claim 17, further comprising a guide roller rotatably mounted to at least one free end of said linking chain pin.

19. The endless tentering chain of claim 17, wherein at least one of said chain link plates has two arms and a bushing, said two arms being connected to said bushing, said linking chain pin extending through said bushing.

* * * * *

UNITED STATES PATENT AND TRADEMARK OFFICE
CERTIFICATE OF CORRECTION

PATENT NO. : 5,367,753
DATED : November 29, 1994
INVENTOR(S) : Adolf Mueller It is certified that error appears in the above-identified patent and that said Letters Patent is hereby corrected as shown below:

Title page,
In [56] References Cited: "Hutzenlamb" should be replace by --Hutzenlaub--.

Col. 2, line 39, "finetuning" should be replaced by --fine-tuning--;
      line 47, "stretchedout" should be replaced by --stretched-out--.

Col. 3, line 61, after "present" insert --compound--.

Col. 5, line 3, replace "il" by --11--;
      line 5, replace "guidebars" by --guide bars--.

Col. 7, CLaim 9, line 2, delete "is" (second occurrence).

Signed and Sealed this

Twenty-fourth Day of January, 1995

Attest:

BRUCE LEHMAN

Attesting Officer     Commissioner of Patents and Trademarks